(12) United States Patent
Bv et al.

(10) Patent No.: US 12,340,544 B2
(45) Date of Patent: Jun. 24, 2025

(54) USER-GUIDED VARIABLE-RATE IMAGE COMPRESSION

(71) Applicant: Adobe Inc., San Jose, CA (US)

(72) Inventors: Suryateja Bv, Hyderabad (IN); Sharmila Reddy Nangi, Hyderabad (IN); Rushil Gupta, Chandigarh (IN); Rajat Jaiswal, Gorakhpur (IN); Nikhil Kapoor, Ludhiana (IN); Kuldeep Kulkarni, Ilkal (IN)

(73) Assignee: Adobe Inc., San Jose, CA (US)

( * ) Notice: Subject to any disclaimer, the term of this patent is extended or adjusted under 35 U.S.C. 154(b) by 465 days.

(21) Appl. No.: 17/714,812

(22) Filed: Apr. 6, 2022

(65) Prior Publication Data

US 2023/0326088 A1 Oct. 12, 2023

(51) Int. Cl.
| | |
|---|---|
| *G06T 9/00* | (2006.01) |
| *G06N 3/045* | (2023.01) |
| *G06N 3/08* | (2023.01) |
| *G06T 3/4046* | (2024.01) |
| *H04N 19/10* | (2014.01) |
| *H04N 19/91* | (2014.01) |

(52) U.S. Cl.
CPC ............. *G06T 9/002* (2013.01); *G06N 3/045* (2023.01); *G06N 3/08* (2013.01); *G06T 3/4046* (2013.01); *G06T 9/005* (2013.01); *H04N 19/10* (2014.11); *H04N 19/91* (2014.11)

(58) Field of Classification Search
CPC ......... G06T 9/005; H04N 19/91; H04N 19/10
See application file for complete search history.

(56) References Cited

U.S. PATENT DOCUMENTS

| | | | | |
|---|---|---|---|---|
| 10,965,948 | B1* | 3/2021 | Appalaraju | H04N 19/124 |
| 2015/0237346 | A1* | 8/2015 | Symes | H04N 19/124 |
| | | | | 375/240.03 |
| 2020/0193238 | A1* | 6/2020 | Ghuge | G06F 18/24 |

OTHER PUBLICATIONS

Cordts et al., "The Cityscapes Dataset for Semantic Urban Scene Understanding," 2016 IEEE Conference on Computer Vision and Pattern Recognition (CVPR), Jun. 2016, pp. 3213-3223.
Li et al., "Learning Convolutional Networks for Content-weighted Image Compression," 2018 IEEE/CVF Conference on Computer Vision and Pattern Recognition, 2018, pp. 3214-3223.
Liu et al., "Deep Learning Face Attributes in the Wild," 2015 IEEE International Conference on Computer Vision (ICCV), 2015, pp. 3730-3738.
Mentzer et al., "High-Fidelity Generative Image Compression." 34th Conference on Neural Information Processing Systems (NeurIPS 2020), 2020, ArXiv abs/2006.09965, 12 pages.

* cited by examiner

*Primary Examiner* — Peter K Huntsinger
(74) *Attorney, Agent, or Firm* — Nicholson De Vos Webster & Elliott LLP

(57) ABSTRACT

Embodiments are disclosed for user-guided variable-rate compression. A method of user-guided variable-rate compression includes receiving a request to compress an image, the request including the image, a corresponding importance data, and a target bitrate, providing the image, the corresponding importance data, and the target bitrate to a compression network, generating, by the compression network, a learned importance map and a representation of the image, and generating, by the compressing network, a compressed representation of the image based on the learned importance map and the representation of the image.

19 Claims, 14 Drawing Sheets

USER-GUIDED VARIABLE-RATE IMAGE COMPRESSION

BACKGROUND

Data compression plays an increasingly important role in daily life. Recently, there has been a surge in digital data such as images and videos, with users creating and sharing content at a rapid pace. Video conferencing has also seen a significant rise as companies and individuals come to see it as a normal means of communication. Due to poor network and bandwidth issues in various parts of the world, large file sizes become a severe bottleneck leading to a poor consumer experience. This creates a need for optimal storage and transport of visual data. Thus, end-to-end image compression techniques that maintain strong image quality have become extremely important. Additionally, as online collaboration has become more commonplace, it is necessary that data is stored optimally in a cloud computing environment to provide a good user experience.

Various compression techniques are used to achieve optimal data storage. One feature of any compression technique is the flexibility to achieve a user-preferred bitrate as users often have strict storage budget requirements. Traditional codecs (JPEG, BPG) allow users to control the bitrate through quality factors. However, they are hardcoded methods with no information of the image context. Deep learning-based approaches forgo hardcoded values by incorporating context and image semantics, but require costly hyperparameter search and retraining to work for multiple desired bitrates. Very recently, variable-rate compression methods have been introduced but provide no theoretical or empirical guarantees of the bitrate in production time. Users are also burdened with the task of having to second-guess parameters that map to an exact bitrate, making the interfaces tedious to use.

Additionally, some users, such as content creators, have specific needs to preserve the details of important parts of their data. For example, in an image capturing the historical monument 'Taj Mahal', preserving the details of the monument is far more important than the background.

SUMMARY

Introduced here are techniques/technologies that enable user-guided variable-rate image compression. The user provides an image to be compressed and a segmentation map that segments the image into regions. For example, for an image of a person's face, the image may be segmented into face, hair, and background segments. For each segment, the user specifies an importance value. The importance value is used by the image compression system to allocate bits to the most important parts of the image, improving the appearance of the important portions of the image upon reconstruction. The user also specifies a target bitrate for the image compression.

The image compression system includes a compression network, which includes an encoder and an importance map network, and a reconstruction network, which includes a decoder. The image, the segmentation map with importance values, and the target bitrate are provided to the compression network which then generates a compressed representation of the image at or near the target bitrate. The compressed representation is generated based on a latent space representation of the image and a learned importance map generated by the importance map network. Subsequently, a reconstruction network is used to reconstruct an image from the compressed representation. The compression and reconstruction networks are trained using a discriminator, to train the reconstruction network to generate photorealistic reconstructed images, and various loss functions to ensure bits are allocated optimally in the importance map while staying within the limits of user-provided bit budget.

Additional features and advantages of exemplary embodiments of the present disclosure will be set forth in the description which follows, and in part will be obvious from the description, or may be learned by the practice of such exemplary embodiments.

BRIEF DESCRIPTION OF THE DRAWINGS

The detailed description is described with reference to the accompanying drawings in which.

DETAILED DESCRIPTION

Figure 1:
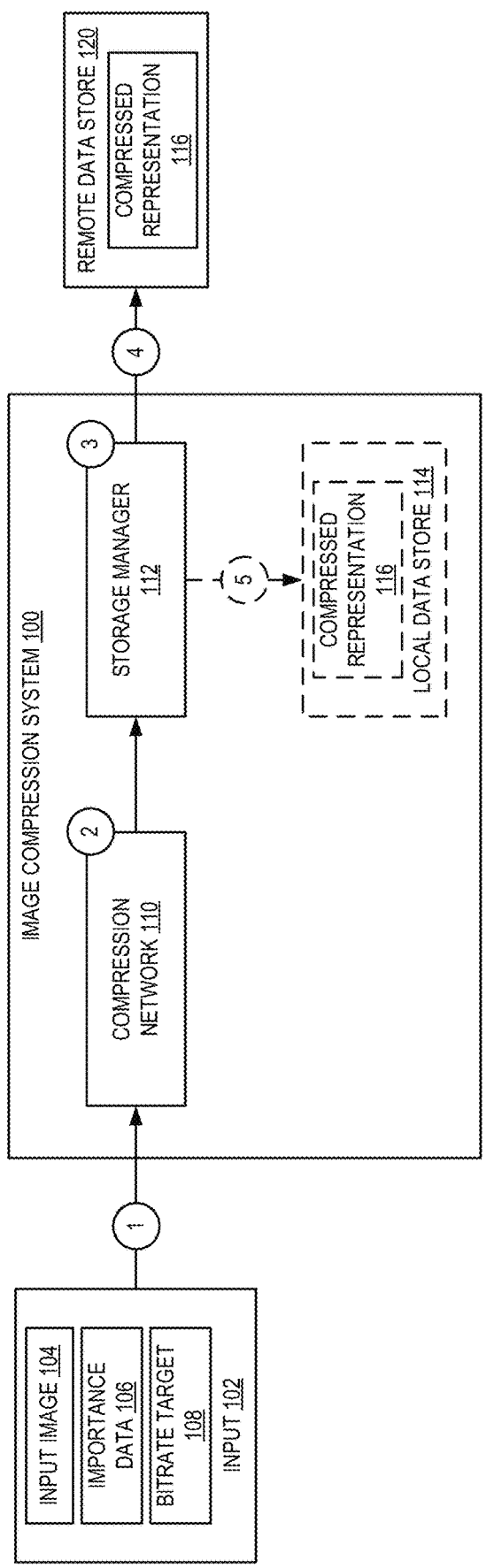
FIG. 1 illustrates a diagram of a process of image compression in accordance with one or more embodiments.

Embodiments provide a user-guided approach to learned image compression method that enables the user to have a direct control over the bitrate and the quality of the reconstructed image. Specifically, a Generative Adversarial Network (GAN)-based image compression allows users to explicitly input a desired bitrate. This also allows for the desired bitrate to be achieved with a single model by leveraging the user input region-wise importance values as a guidance for a learned importance map, which in turn determines the attained output bitrate. Embodiments work on multiple datasets over a wide range of bitrates and achieves similar or better performance as compared to previous learned image compression methods that are trained only for particular bitrates.

In some embodiments, the user provides an image, a corresponding importance map, and a target bitrate to a compression network. The importance map may include a segmentation mask that includes multiple regions, with each region assigned an importance value by the user. Based on the target bitrate and the importance map, the compression network generates a compressed representation of the image. As discussed further below, the compression network includes an encoder, which generates a latent space representation of the input image, and an importance map network, which learns an importance map. These are combined to create the compressed representation. The compressed representation can then be stored, locally or remotely, shared with other users, etc., just like any other compressed file. When the image is later requested, the compressed representation is provided to a reconstruction network which includes a decoder trained to reconstruct the image.

The overall compression-decompression pipeline provides user-guided machine learning-based variable bitrate compression. The importance network learns optimal bit allocations via user preferences while staying within the limits of available bit budget. This gives the user control over the bitrate and the allocation of bits to more important regions of the image. Further, a single network can provide variable bitrate compression. This saves significant time and resources that would ordinarily be required to be used to train completely separate models for each bitrate that is to be supported.

The compression network and reconstruction network are trained using a generative adversarial network approach. In particular, a discriminator is used to train the compression network and reconstruction network along with an equivalence-distortion loss function that takes in the user importance map and the desired bitrate as input to constrain the learning of output importance weights, which in turn help in achieving the desired bitrate.

Traditional image compression standards, like JPEG, JPEG2000, and HEVC rely on hand-crafted modules involving discrete cosine transforms or wavelet transforms, quantization, and entropy coding. Traditional codecs like JPEG2000 compress on a per-instance level with no learning involved, thereby having poor performance at low bitrates with artifacts such as blurring, ringing, and smudging. To overcome the limitations of hand-crafted modules, several compression approaches based on RNNs, and auto-encoders have been proposed. However, these algorithms construct visually pleasing images at considerably high bitrates but do not perform as well at extremely low bitrates. Additionally, these techniques typically work on only a single bitrate target, and new networks have to be trained for each bitrate that is to be supported. To the extent that prior techniques provide variable bitrate support, they require extensive knowledge on the part of the user to be able to tune parameters to attain the target bitrate.

Accordingly, embodiments provide a single model for a wide range of bitrates that ensures photo-realism and maintains visual quality as per the bit budget allocated while facilitating the user an explicit control on the desired target bitrate. As such, no network-specific knowledge is required by the user to obtain the target bitrate.

FIG. 1 illustrates a diagram of a process of image compression in accordance with one or more embodiments. As shown in FIG. 1, an image compression system 100 can be used to generate a compressed representation of an input image. The image compression system 100 may be implemented as a standalone compression application or as part of another system or service, such as an image processing application, document management application, etc. In some embodiments, the techniques described with respect to FIG. 1 can be performed following an explicit request to compress an image (e.g., via selection of an image compression action in a user interface, etc.) or may be performed automatically when the user attempts to save an image, share an image, etc. For example, if a user is storing or sharing an image to a remote location (e.g., over a network connection), then the image may first be compressed. Additionally, or alternatively, if the storage location has a storage availability below a threshold number of bytes, then the image may first be compressed. Similarly, compression settings may be stored as part of a user profile or other settings associated with a user, such that upon saving or storing an image, the image is compressed based on the conditions defined in the user profile.

When a request to compress an image is received, the user can provide input data 102 to image compression system 100, as shown at numeral 1. In particular, the user can provide an input image 104, importance data 106, and a bitrate target 108. In some embodiments, the input image 104 can be provided by selecting a locally stored image or providing an identifier corresponding to a storage location of the image (e.g., a URL, URI, etc.). The importance data 106 may include an importance map which is a mask of the image that has been segmented into a plurality of regions, where each region has been annotated with an importance value that represents the relative importance of each region to the user. During compression, the importance values are used to allocate more bits to more important regions and fewer bits to less important regions. This way, the appearance of more important regions, following compression, is better preserved as compared to less important regions. In some embodiments, the segmentation mask is provided by the user. Alternatively, the input image 104 may first be provided to a semantic segmentation model which generates the segmentation mask. Once generated, the user annotates the segmented regions with importance values.

Once the input data 102 is received by image compression system 100, it is provided to compression network 110. Compression network 110 is a machine learning model, or models, such as a neural network, that has been trained to compress input images at variable bitrates based on the importance data. A neural network may include a machine-learning model that can be tuned (e.g., trained) based on training input to approximate unknown functions. In particular, a neural network can include a model of interconnected digital neurons that communicate and learn to approximate complex functions and generate outputs based on a plurality of inputs provided to the model. For instance, the neural network includes one or more machine learning algorithms. In other words, a neural network is an algorithm that implements deep learning techniques, i.e., machine learning that utilizes a set of algorithms to attempt to model high-level abstractions in data.

At numeral 2, the compression network 110 generates a compressed representation of input image 104 based on the importance data 106, where the compressed representation achieves the bitrate target 108. As discussed further below, the compression network 110 may include multiple networks, including an encoder and an importance map network. The encoder generates a latent space representation of the input image and the importance map network learns an importance map for the image based on the user's importance data 106 and the input image 104. The latent space representation and the learned importance map are then combined to generate a compressed representation 116 of the input image.

At numeral 3, the compressed representation can be stored or shared by storage manager 112. For example, the compressed representation 116 can be stored to a remote data store 120, as shown at numeral 4. This may include a storage location such as a cloud storage location provided by a storage service, an FTP or other storage site accessible to the user, etc. In some embodiments, the remote data store may be associated with a different user, such as a different user's cloud storage account, computing device, etc. and the compressed representation may be shared with the different user. Optionally, the compressed representation 116 may additionally, or alternatively, be stored locally in local data store 114 (e.g., on the same device as image compression system 100 or a local network connected device accessible to image compression system 100), as shown at numeral 5.

Figure 2:
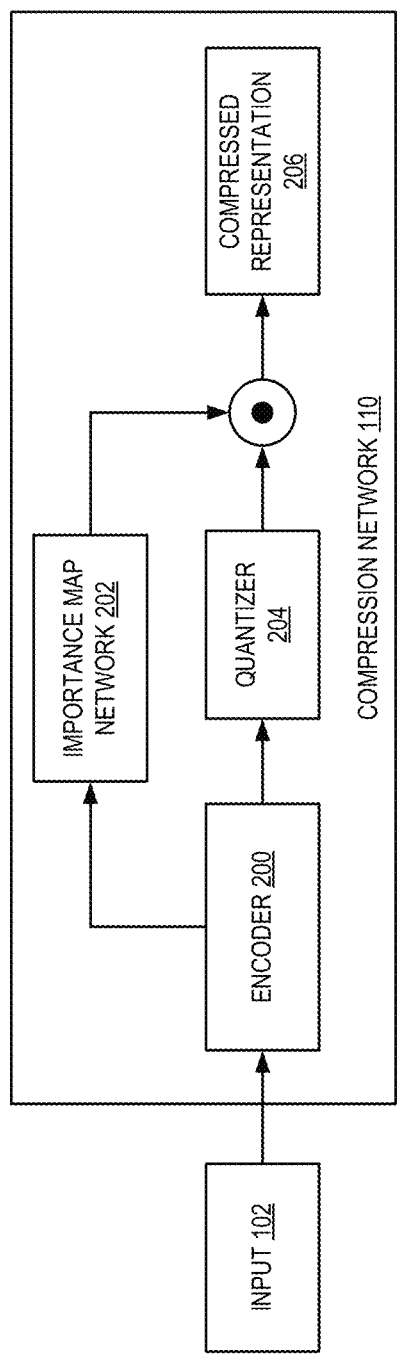
FIG. 2 illustrates a diagram of an image compression network in accordance with one or more embodiments.

FIG. 2 illustrates a diagram of an image compression network in accordance with one or more embodiments. As shown in FIG. 2, a compression network includes an encoder 200, an importance map network 202, and a quantizer 204. As discussed, the compression network receives an input 102 that includes an image to be compressed, user-provided importance data, and a target bitrate. Based on this information, the compression network generates a compressed representation 206 of the input image at or near the target bitrate which may then be stored, shared, etc.

In some embodiments, encoder 200 generates a latent representation of shape (C,H/n,W/n) from a concatenation of the user-provided importance map and the input image. As discussed further below, the encoder may include a series of convolution layers and residual blocks. The importance map network 202 takes an intermediate input representation from the encoder and generates a single channel learned importance map that is close to the user input importance map. Each pixel of this learned map includes values between 0 and 1, dictating the number of latent representation channels to use for storing the information of that pixel.

The output of the encoder 200 is a latent representation of the importance map and input image concatenation. This latent representation is then provided to a quantizer 204. In particular, a binary quantizer may be used which binarizes the output of the encoder by converting each value to either −1 or 1. This quantized output is then combined with the learned importance map to generate the compressed representation 206. In some embodiment, the quantized output and the learned importance map are combined by taking a Hadamard Product (e.g., an element-wise product). Since there is a loss of information at this step, the compression of the input image is lossy.

Figure 3:
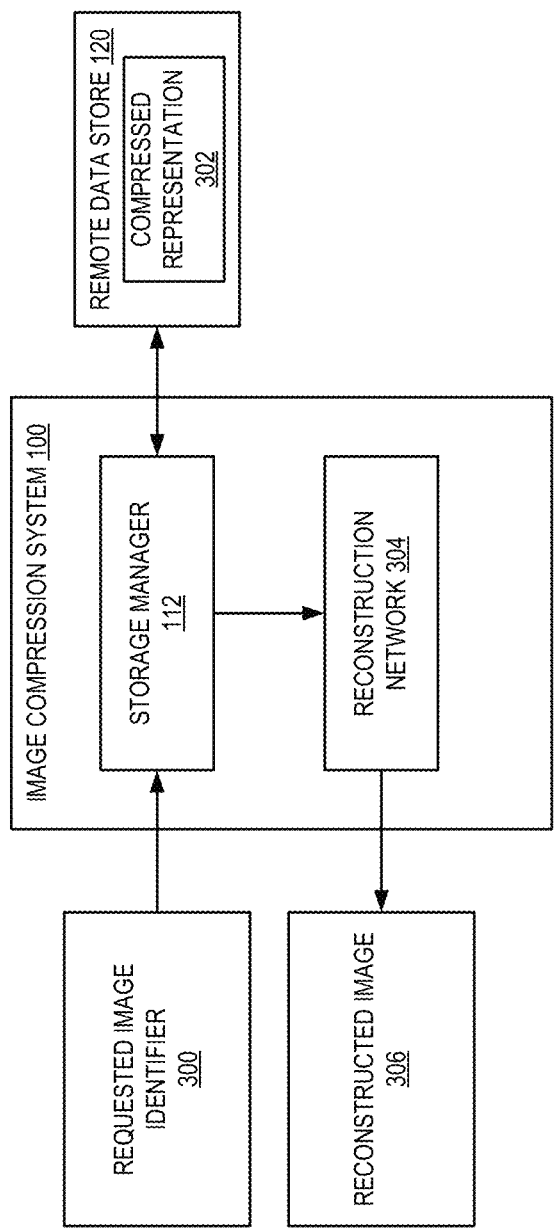
FIG. 3 illustrates a diagram of image reconstruction in accordance with one or more embodiments.

FIG. 3 illustrates a diagram of image reconstruction in accordance with one or more embodiments. As discussed, once a compressed representation of an input image has been generated, the compressed representation can be stored or shared. When a user wishes to view the image, the compressed representation is provided to a reconstruction network which then generates a reconstructed image from the compressed representation. For example, as shown in FIG. 3, a user or other entity may send a request to image compression system 100 for a particular image. Although the example of FIG. 3 is described with respect to an image compression system, in some embodiments the reconstruction network may be hosted by a different service or system implemented separately from the image compression system 100.

In some embodiments, an image is requested by providing an image identifier 300. For example, a URL, URI, or other identifier. associated with the image, a storage location, etc. The storage manager 112 can locate a compressed representation associated with the requested image using the requested image identifier 300. Where the requested image identifier is a storage location, the storage manager retrieves the compressed representation 302 from the storage location associated with the identifier. Alternatively, the storage manager 112 may maintain a mapping of image identifiers to compressed representations, where the image identifier serves as a key and the storage location as a corresponding value in the mapping. The storage manager identifies the storage location of the compressed representation 302 using the identifier and retrieves it. The example of FIG. 3 shows the compressed representation 302 stored in a remote data store, which may include a cloud-based storage service, storage server, or other location. Additionally, or alternatively, in various embodiments the compressed representation may be stored locally.

The compressed representation is then provided to reconstruction network 304 to generate reconstructed image 306. In some embodiments, the reconstruction network is a decoder neural network. In some embodiments, the decoder minors the encoder with a series of deconvolution layers and residual blocks. It reconstructs the image from the compressed latent representation of input image. The output of the reconstruction network 304 is the reconstructed image 306 corresponding to the compressed representation 302. The reconstructed image 306 is then returned to the requestor. For example, the reconstructed image may then be rendered on a display for viewing by a user.

Figure 4:
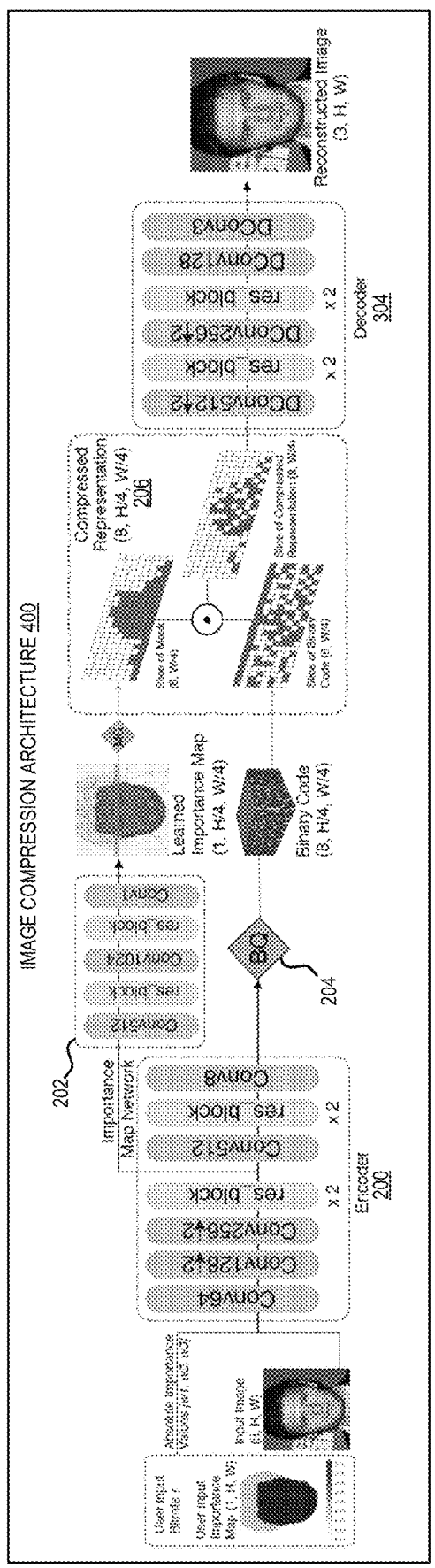
FIG. 4 illustrates a diagram of an image compression architecture in accordance with one or more embodiments.

FIG. 4 illustrates a diagram of an image compression architecture 400 in accordance with one or more embodiments. As shown in FIG. 4, the image compression architecture 400 is an end-to-end pipeline with $(C,n^2)=(8,16)$ which includes an encoder-decoder network which encodes an input into a compressed representation and decodes the compressed representation into a reconstructed image. ConvC is a convolution with C channels, $\uparrow 2$, $\downarrow 2$ indicate strided up or down convolutions. As discussed above, the encoder and decoder may be implemented separately in practice, allowing for the compression and reconstruction of images by different users, entities, etc., facilitating distributed storage and sharing of the compressed images.

The encoder receives an input image having three channels (e.g., RGB) and a height and width of H and W, respectively, and a user input importance map having one channel (e.g., importance values) and the same height and width as the input image. The encoder generates a latent representation of shape (C,H/n,W/n) from the concatenation of user input importance map ($m_u = \Sigma p_i * s_i$ where $s_i$ are segmentation masks of various regions) and input image of shape (3+1,H,W). As shown, the encoder 200 is a neural network including a plurality of layers including convolutional layers and residual block layers. For example, in the example of FIG. 4, the encoder includes the following layers:

| Layer | In Dimensions | Out Dimensions |
| --- | --- | --- |
| Conv_0 | [C, H, W] | [64, H, W] |
| Conv_1 | [64, H, W] | [128, H/2, W/2] |
| Conv_2 | [128, H/2, W/2] | [256, H/4, W/4] |
| Res_block_0 | [256, H/4, W/4] | [256, H/4, W/4] |
| Res_block_1 | [256, H/4, W/4] | [256, H/4, W/4] |

| Layer | In Dimensions | Out Dimensions |
| --- | --- | --- |
| Conv_3 | [256, H/4, W/4] | [512, H/4, W/4] |
| Res_block_2 | [512, H/4, W/4] | [512, H/4, W/4] |
| Res_block_3 | [512, H/4, W/4] | [512, H/4, W/4] |
| Conv_4 | [512, H/4, W/4] | [8, H/4, W/4] |

The specific architecture depicted in FIG. 4 is one example of an architecture that may be used to implement embodiments described herein. Alternative embodiments may be implemented including more or fewer layers, different types of layers, etc.

The importance map network 202 receives an intermediate input representation from the encoder (e.g., following the first pair of residual blocks) and generates a single channel learned importance map that is close to the user input importance map. Each pixel of this learned map contains values between 0 and 1, which determines the number of latent representation channels to use for storing the information of that pixel. For example, in the example of FIG. 4, the importance map network includes the following layers:

| Layer | In Dimensions | Out Dimensions |
| --- | --- | --- |
| layer_0 | [256, H/4, W/4] | [512, H/4, W/4] |
| im_res_block_0 | [512, H/4, W/4] | [512, H/4, W/4] |
| layer_1 | [512, H/4, W/4] | [1024, H/4, W/4] |
| im_res_block_1 | [1024, H/4, W/4] | [1024, H/4, W/4] |
| layer_2 | [1024, H/4, W/4] | [1, H/4, W/4] |

In some embodiments, each residual layer includes:

| Layer | In Dimensions | Out Dimensions | Kernel Size | Stride |
| --- | --- | --- | --- | --- |
| layer_0 | [C, H, W] | [C, H, W] | (3, 3) | (1, 1) |
| layer_1 | [C, H, W] | [C, H, W] | (3, 3) | (1, 1) |

In the example of FIG. 4, the input image is of a person, and the importance map has been divided into areas (also referred to as regions) corresponding to background, face, and hair. Each area has been assigned a weight by the user indicating the importance of that area. In the learned importance map, the values are distributed in the corresponding areas. Pixels with high texture or edges within an area are weighted higher. The average learned importance values will be similar, though not necessarily identical to, the importance values provided by the user. This means that, on average across a region, the importance mirrors the user's preferences while allowing for variation within the region. For example, the pixels of the region corresponding to the eyes have more details and therefore can be given a higher importance value than the relatively smooth pixels representing the person's cheeks.

As noted, the binary quantizer (BQ) binarizes the output of the encoder by converting each value to either −1 or 1. The output of the importance map is provided to a mask generator (MG) which creates an 8-dimensional mask representation to match the dimensions of the output of the encoder 200. The importance mask representation and the quantized output are then combined (e.g., via elementwise multiplication) to generate the compressed representation 206.

As discussed, the decoder mirrors the encoder with a series of deconvolution layers and residual blocks. It reconstructs the image from the compressed latent representation of the input image. In some embodiments, the decoder includes the following layers:

| Layer | In Dimensions | Out Dimensions |
| --- | --- | --- |
| deconv_0 | [8, H/4, W/4] | [512, H/2, W/2] |
| Res_block_0 | [512, H/2, W/2] | [512, H/2, W/2] |
| Res_block_1 | [512, H/2, W/2] | [512, H/2, W/2] |
| deconv_1 | [512, H/2, W/2] | [256, H, W] |
| Res_block 2 | [256, H, W] | [256, H, W] |
| Res_block_3 | [256, H, W] | [256, H, W] |
| deconv_2 | [256, H, W] | [128, H, W] |
| deconv_3 | [128, H, W] | [3, H, W] |

Figure 5:
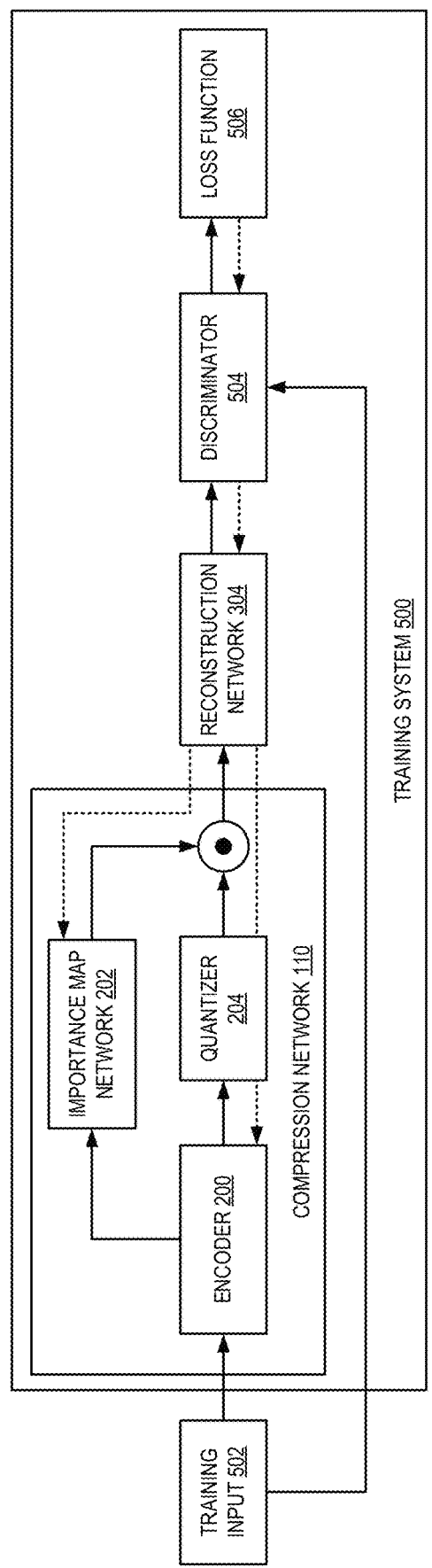
FIG. 5 illustrates a diagram of a training machine learning models to perform variable rate image compression and reconstruction in accordance with one or more embodiments.

FIG. 5 illustrates a diagram of a training machine learning models to perform variable rate image compression and reconstruction in accordance with one or more embodiments. As shown in FIG. 5, a training system 500 can be used to train the neural networks in the compression pipeline. In various embodiments, the training system 500 can be implemented as part of the image compression system, as a standalone training system, or as part of larger machine learning service which trains and deploys machine learning models. In the example of FIG. 5, a GAN-style training technique is performed using a discriminator 504 to train the models.

During training, training inputs 502 are provided to the compression network 110. The training inputs may include data much like that which would be introduced at inference time, specifically input images and corresponding importance maps, as well as target bitrates. For each training input (e.g., image, importance map, target bitrate triplet), the compression network 110 generates a compressed representation of the input training image using the techniques described above. The compressed representation is then provided to reconstruction network 304 which generates a reconstructed image.

The reconstructed image and the training input are then provided to a discriminator 504 which attempts to distinguish between the original image and the reconstructed image. In some embodiments, the discriminator receives the reconstructed image concatenated with the learned importance map and the input training image concatenated with the training importance map. The discriminator then predicts which of the images is real or fake. This prediction is used by one or more loss functions 506 to generate an error that is propagated back to the networks for training (as indicated by dotted lines in FIG. 5).

In some embodiments, various loss functions are used during training. In the following section, the input image is denoted by 'x' and the reconstructed image is denoted by 'y'. The loss function 506 may include an Equivalence Distortion (ED) Loss. This loss function ensures bits are allocated optimally in the importance map while staying within the limits of user-provided bit budget (e.g., to achieve the target bitrate). Let $L_{mse}$ and $L_{ssim}$ denote the mean-squared error and MS-SSIM between input and reconstructed images. Then, the distortion loss $L_D$ is given by, $$L_{mse} = m'_u \odot \|x-y\|^2$$

$$L_{ssim} = 1\text{-MS-SSIM}(x,y)$$

$$LD = \lambda 1 Lmse + \lambda 2 Lssim$$

where $\lambda_1 = 1.25$ and $\lambda_2 = 0.1$. Let $L_E$ denote the equivalence loss obtained when importance values of different regions between the user input importance map and learned importance map are compared. Then, $$L_{whole} = \max\left(0, \sum m_l - \sum m_u\right)$$

$$m_l^i = \sum m_l \odot s_i/(\alpha + \sum s_i), i = 1 \ldots n$$

$$m_u^i = \sum m_u \odot s_i/(\alpha + \sum s_i), i = 1 \ldots n$$

$$L_{region}^1 = \frac{1}{n}\sum_{i=1}^{n}\max(0, m_l^i - m_u^i)$$

$$L_{region}^2 = \frac{1}{n}\sum_{i=1}^{n}\max(0, m_u^i - m_l^i)$$

$$L_E = L_{whole} + L_{region}^1 + \lambda_3 L_{region}^2$$

where $\lambda_3=0.9$, n is the number of regions in an image, $\alpha$ is a smoothing constant with value $10^{-8}$, $m_u$ denotes the nearest-neighbor down-sampled version of user input importance map$^{m_u',m_l}$ denotes learned importance map and $s_i$ denotes nearest-neighbor down-sampled version of segmentation mask for region i.

$L_{whole}$ penalizes the model when the sum of values in learned map exceed the user input map, thereby staying within the limits of available bit budget. $L^1_{region}$ and $L^2_{region}$ enforce both the maps to contain similar importance values. Since the maps are compared region-wise and not as one single entity, the model adaptively distributes importance values within a region in the learned map by giving higher weight to areas with high-texture or edges and lower weight to flat areas. $L^2_{region}$ is given a smaller coefficient of $\lambda_3=0.9$ since $m_u^i - m_j^i > 0$ remains within the bit budget consideration. The total loss, $L_{ED}$ then becomes $L_{ED}=L_E+L_D$.

In some embodiments, a VGG Feature Loss is also utilized. For example, the reconstructed image and the input image are both fed into a pre-trained VGG16 network and the features computed by the network at various intermediate layers for the two inputs are compared using an L1 Loss. In one implementation, features can be extracted from four positions in the VGG network and the corresponding L1 losses are aggregated to get the VGG loss value, as follows:

$$\text{VGG-Loss}(x,y)=L1(\text{VGG}(x),\text{VGG}(y))$$

In some embodiments, a GAN Feature Loss is also utilized. The features learned by the discriminator network for both of its inputs are compared with each other using L1 Loss. This enforces the reconstructed image to be visually close to the input image so that the discriminator gets fooled and makes mistakes in its task of classifying the original image. Let D denote the discriminator and x, y denote the input and reconstructed image respectively. Then, $$\text{GAN-Feature-Loss}(x,y)=L1(D(x),D(y))$$

Additionally, training is performed at a variety of target bitrates. This ensures that the resulting model can perform variable bitrate compression. As discussed, this is an improvement over past attempts at machine learning-based compression which require a distinct model to be trained for each bitrate that is to be supported at inference time.

Given an image of size (H, W), then the latent image size is (H/n, W/n) with C channels to hold the bits. For simplicity, assume that the image includes three areas: A1, A2, A3 in the original image, and $A_1^r, A_2^r, A_3^r$ in the latent image. Let the proportion of their areas in the image be k1, k2, k3. In order to train for multiple target bitrates (t) and importance value combinations [p1, p2, p3], the target bitrate and importance value combinations are sampled from a Uniform distribution and Dirichlet distribution respectively. In this example, a maximum bitrate is 0.5, however in various embodiments the maximum bitrate that may be supported can be larger or smaller.

$$t \sim U(0,0.5)$$

$$p \sim \text{Dir}([1.0,1.0,1.0])$$

Once the networks have converged (e.g., the loss is below a threshold value), then the networks are trained and may be deployed for use in compressing and reconstructing arbitrary input images.

Figure 6:
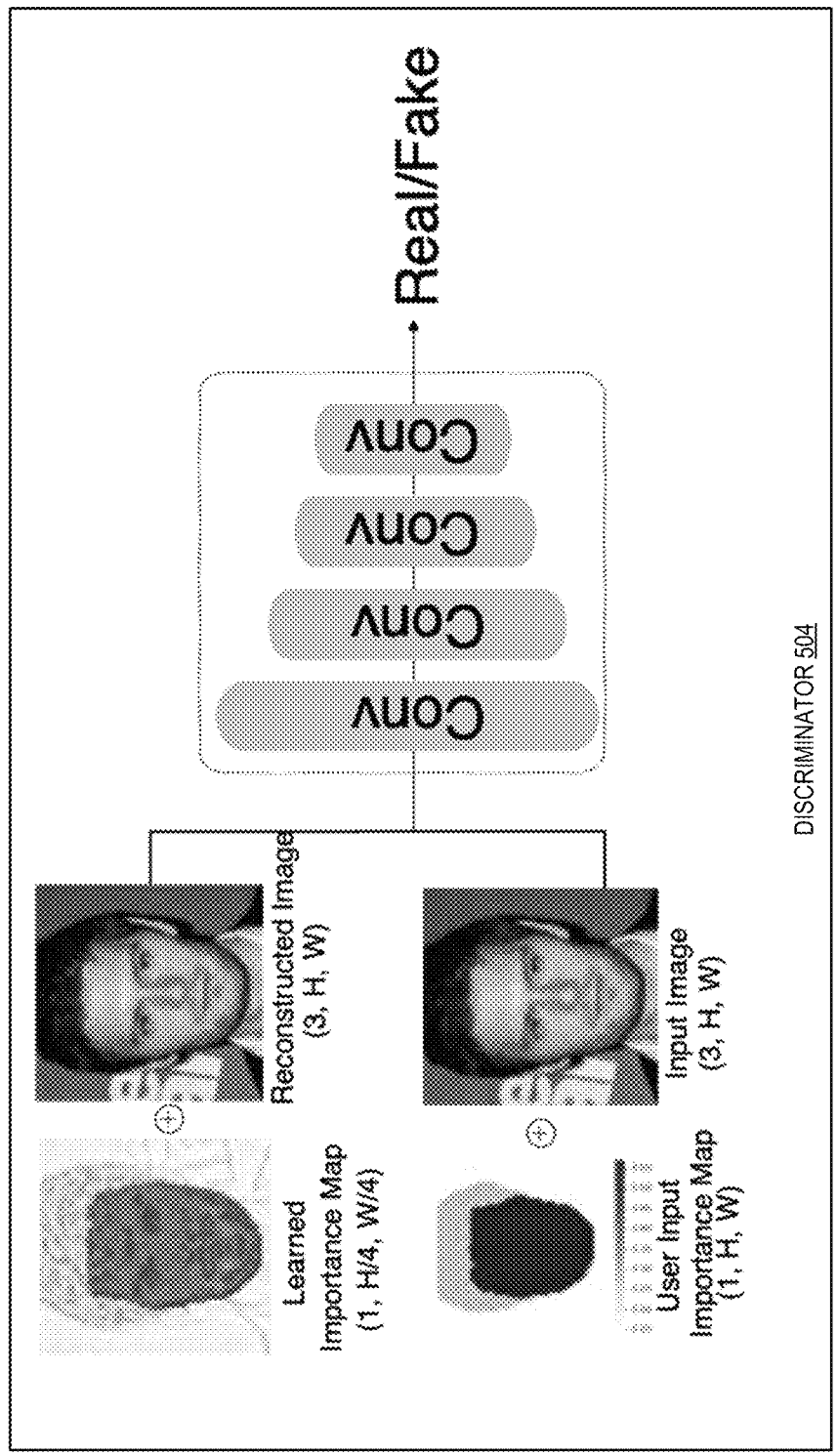
FIG. 6 illustrates a diagram of a discriminator network in accordance with one or more embodiments.

FIG. 6 illustrates a diagram of a discriminator network in accordance with one or more embodiments. As discussed, the networks used by the image compression system may be trained as a GAN using a discriminator 504. The discriminator 504 ensures photo-realism of reconstructed images as it attempts to distinguish between input (original) image and reconstructed (fake) image. As discussed, it receives both the images concatenated with segmentation masks and user/learned importance maps as its input. In some embodiments, a multi-scale discriminator that includes four discriminators is used, each operating at a different image scale and having five convolution layers each. Each convolution layer includes a reflection padding and a 2D convolution, along with a Leaky ReLU activation. Each convolution layer in the discriminator operates at progressively lower scales.

Figure 7:
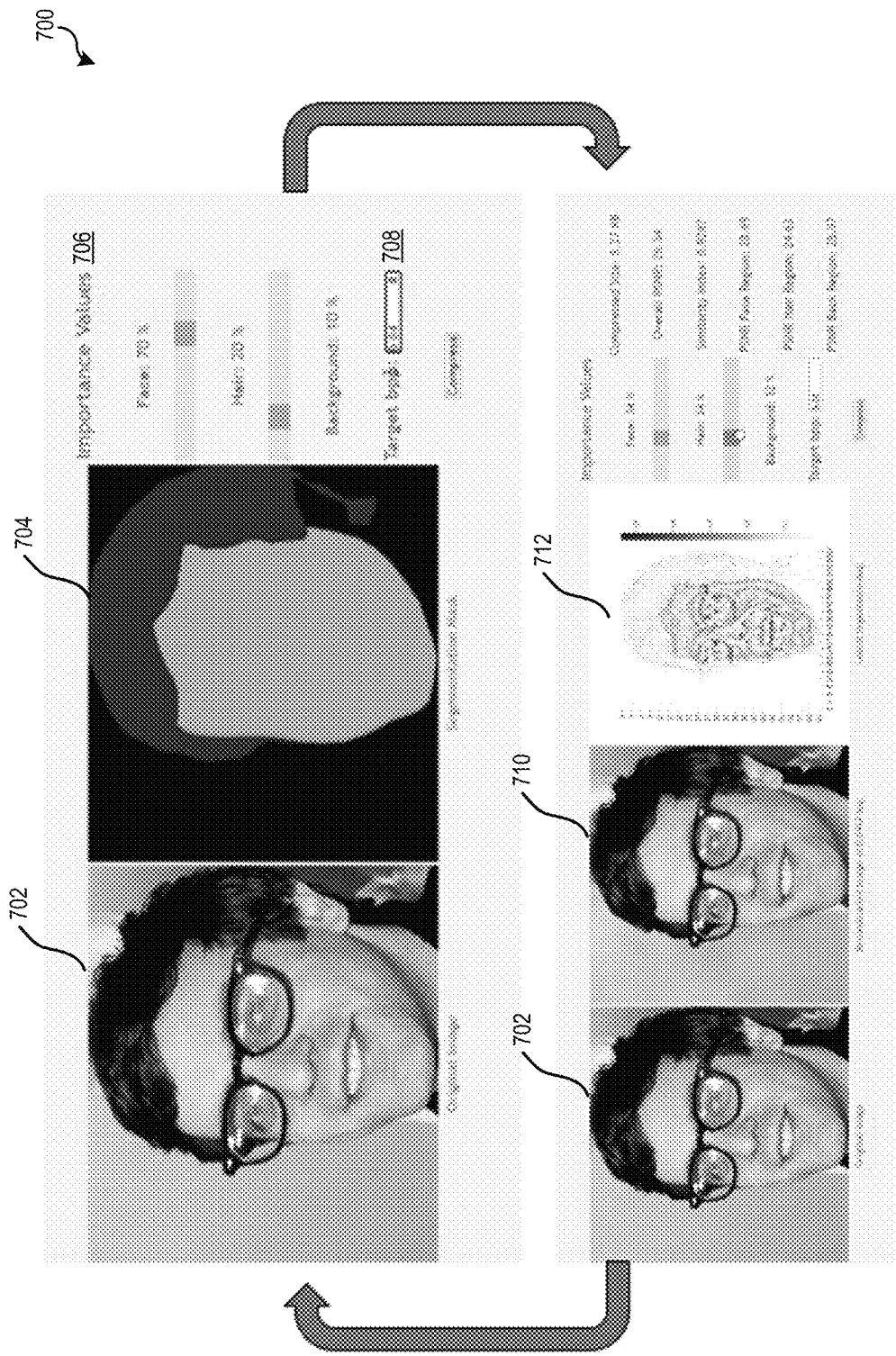
FIG. 7 illustrates a diagram of a user interface in accordance with one or more embodiments.

FIG. 7 illustrates a diagram of a user interface 700 in accordance with one or more embodiments. As shown in FIG. 7, the user can select an image 702 to be compressed and a corresponding segmentation mask 704. The user can then specify the importance values 706 for the regions identified in the segmentation mask. In this example, the user specifies the importance values using sliders that add up to a total of 100%. Alternatively, other user interface elements may be used to specify the importance values which may add up to 100%, 1, or other value depending on implementation. Additionally, the user specifies the target bitrate 708.

When the user requests that the image be compressed (e.g., by interacting with the user interface 700), then compression is performed on the image, as discussed above. In some embodiments, the user can be presented with the original image, a copy of the reconstructed image 710, and a visual representation of the learned importance map 712. The user can then iterate over the compression settings as needed. For example, if the reconstructed image is not of high enough quality the user may increase the bitrate, change the relative importance values, etc.

Figure 8:
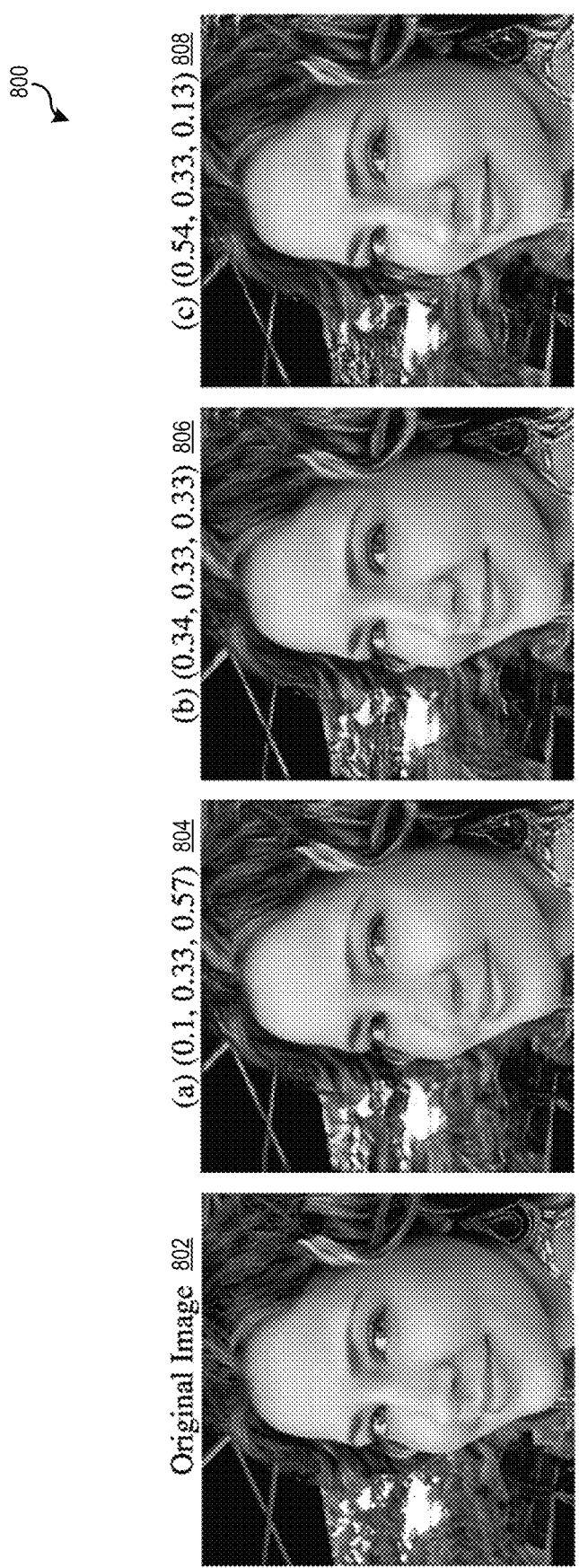
FIG. 8 illustrates a comparison of reconstructed images in accordance with one or more embodiments.

FIG. 8 illustrates a comparison 800 of reconstructed images in accordance with one or more embodiments. In the example of FIG. 8, an original image 802 is of a person's face. The image is segmented into three regions (not shown): face, hair, and background. In this example, the importance of the face region is increased from 0.1 in reconstructed image (a) 804 to 0.54 in reconstructed image (c) 808, with the resulting quality increases of the face region in the reconstructed images.

As can be seen in FIG. 8, reconstructed image (a) 804 has importance values for face, hair, and background of (0.1, 0.33, 0.57). As shown, this low importance value for the face region results in relatively fewer bits being allocated to the pixels of the face region. This leads to various artifacts, as shown. However, as the importance value of the face increases, the quality of the face region also increases. For example, most of the facial artifacts are gone from reconstructed image (b) 806, and reconstructed image (c) 808 provides a good reconstruction of the face region, though at the cost of a poorer reconstruction of the background.

Figure 9:
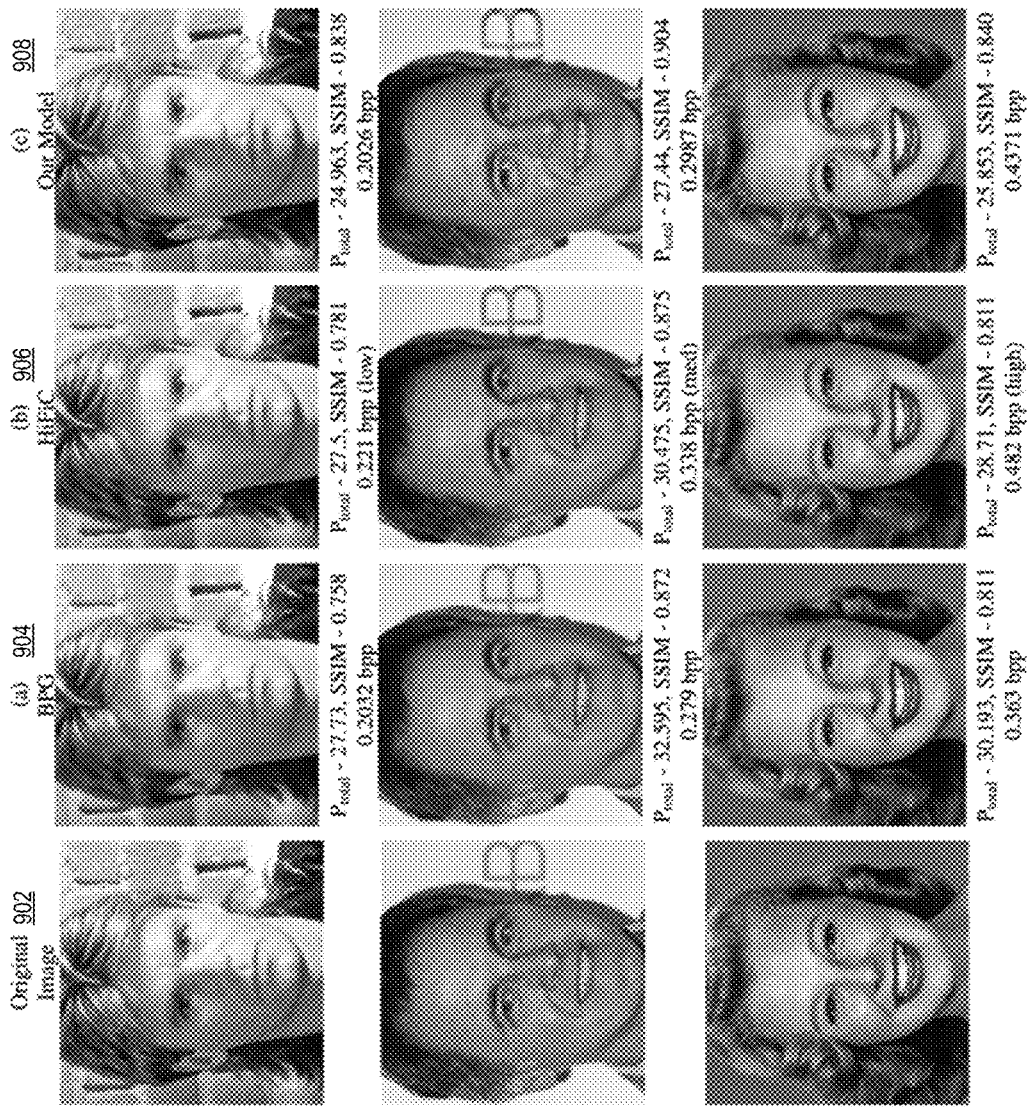
FIG. 9 illustrates a qualitative comparison of reconstructed images using various techniques in accordance with one or more embodiments.

FIG. 9 illustrates a qualitative comparison of reconstructed images using various techniques in accordance with one or more embodiments. FIG. 9 shows a qualitative comparison of the results of a compression model implemented according to the techniques described herein (e.g., image (c) 908) to BPG and High-Fidelity generative Compression (HiFiC) baselines at three different target bitrates. The PSNR and SSIM are reported for each of the compressed reconstruction. It is noted that BPG 904 performs particularly poorly at low bitrates, while HiFiC and a model as described herein perform comparably. Comparing against both the baselines, embodiments produce reconstructions with the highest SSIM. However, embodiments achieve this result after training a single model once, whereas HiFiC requires training multiple models, one for each target bitrate. This means that embodiments perform as well or better than existing techniques while requiring substantially less training time and resources.

Figure 10:
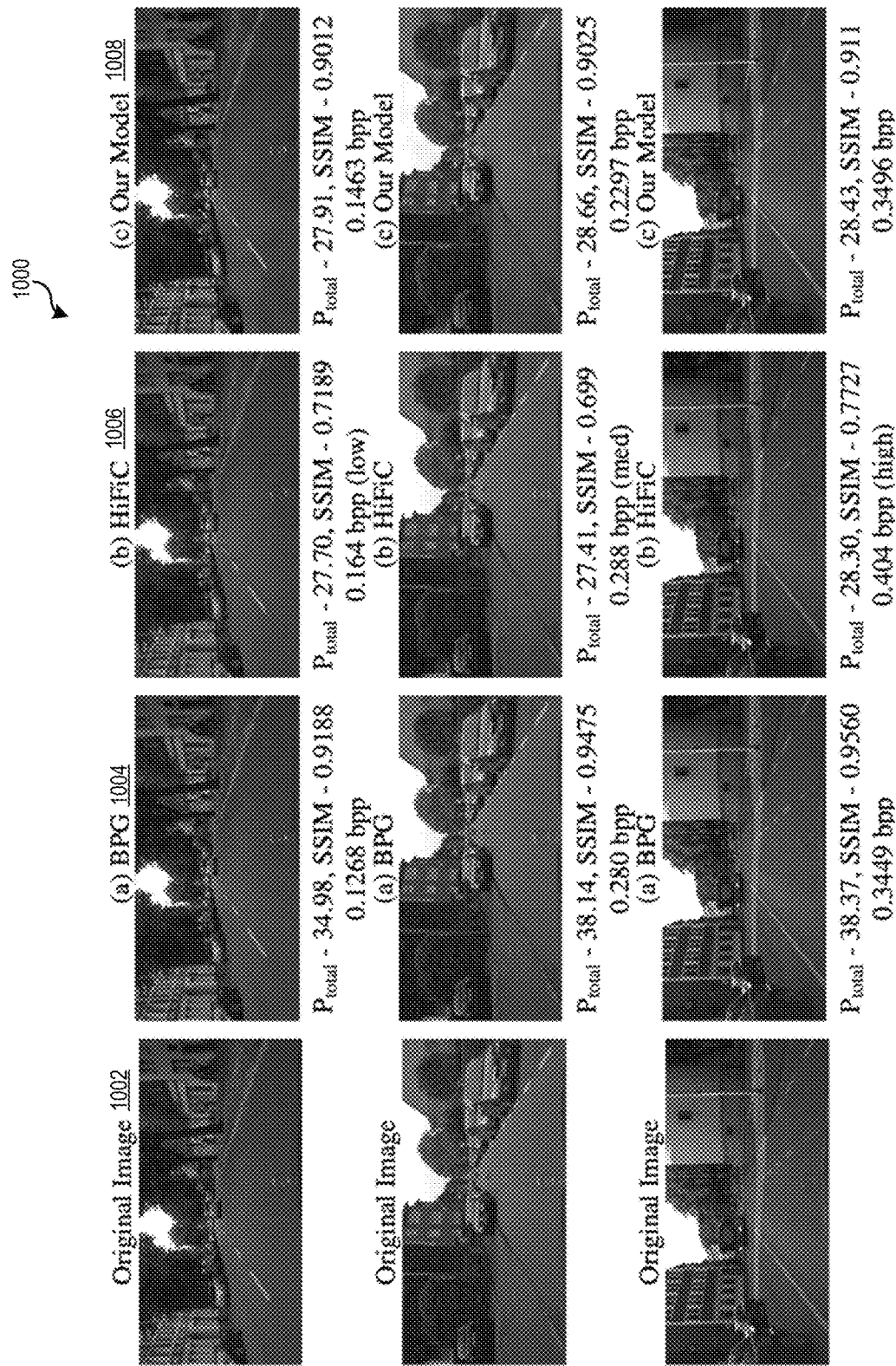
FIG. 10 illustrates a qualitative comparison of reconstructed images using various techniques in accordance with one or more embodiments.

FIG. 10 illustrates a qualitative comparison 1000 of reconstructed images using various techniques in accordance with one or more embodiments. Although embodiments have been described with respect to headshots of people, images including diverse representations of objects may also be used. For example, in FIG. 10 a cityscape image 1002 is compressed. Similar to FIG. 9, embodiments achieve comparable or better results 1008 to the baseline techniques 1004, 1006 at various target bitrates, showing that a variable bitrate compression model is generalizable to images regardless of their content.

Figure 11:
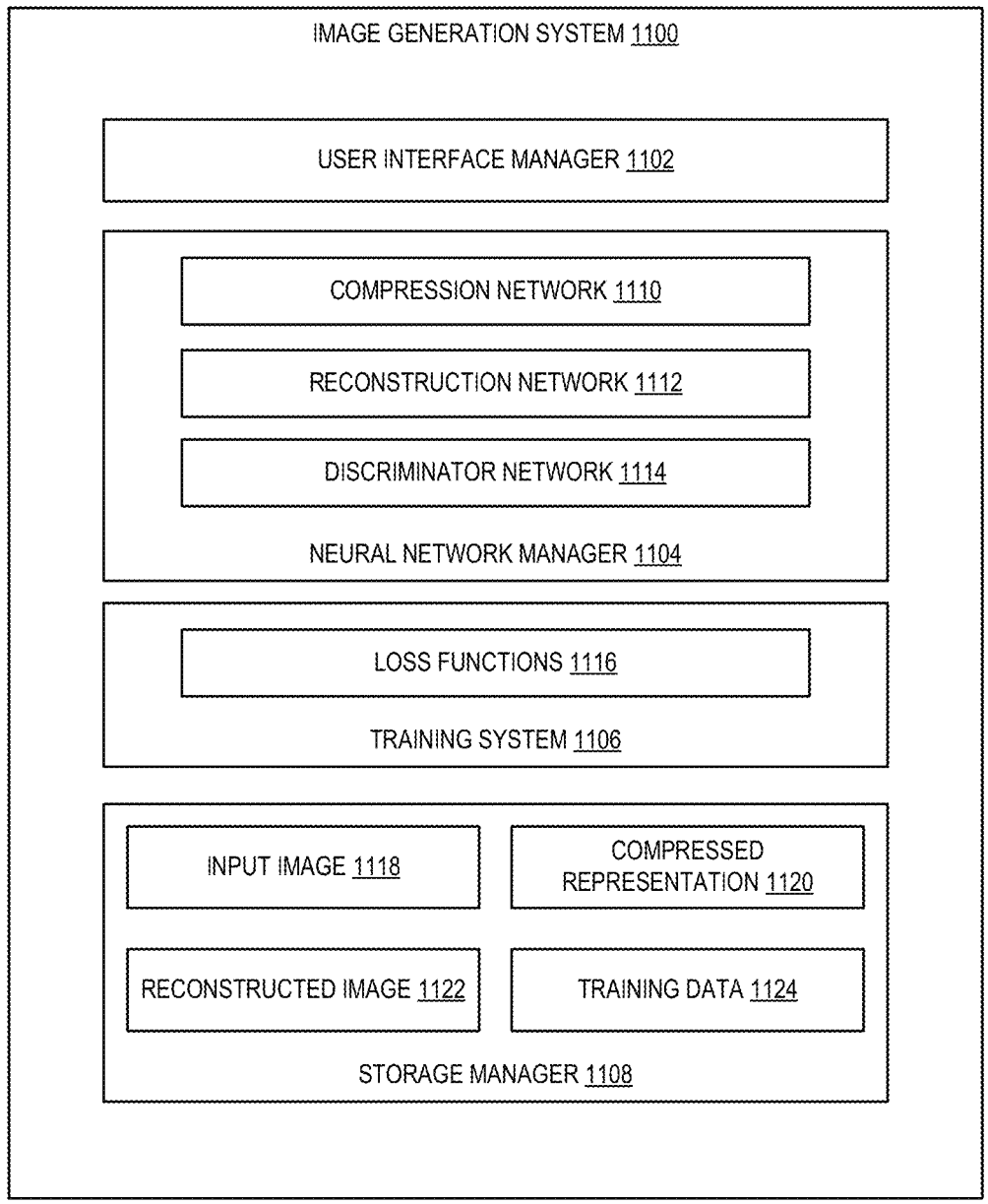
FIG. 11 illustrates a schematic diagram of an image compression system in accordance with one or more embodiments.

FIG. 11 illustrates a schematic diagram of image compression system (e.g., "image compression system" described above) in accordance with one or more embodiments. As shown, the image compression system 1100 may include, but is not limited to, user interface manager 1102, neural network manager 1104, training system 1106, and storage manager 1108. The neural network manager 1104 includes a compression network 1110, a reconstruction network 1112, and a discriminator network 1114. The training system 1106 includes loss functions 1116. The storage manager 1108 includes input image 1118, compressed representation 1120, reconstructed image 1122, and training data 1124.

As illustrated in FIG. 11, the image compression system 1100 includes a user interface manager 1102. For example, the user interface manager 1102 allows users to provide input image data, target bitrate, and importance data to the image compression system 1100. In some embodiments, the user interface manager 1102 provides a user interface through which the user can upload the input images 1118 which are to be compressed, as discussed above. Alternatively, or additionally, the user interface may enable the user to download the images from a local or remote storage location (e.g., by providing an address (e.g., a URL or other endpoint) associated with an image source). In some embodiments, the user interface can enable a user to link an image capture device, such as a camera or other hardware to capture image data and provide it to the image compression system 1100. The user interface manager 1102 also enables the user to input and modify importance values and a target bitrate. In some embodiments, the user can view a reconstructed image that has been generated based on the compression settings and compare the results to the original image.

Additionally, the user interface manager 1102 allows users to request the image compression system 1100 to reconstruct an image from a compressed representation. For example, the user can provide or identify a compressed representation of an image and the user interface manager can send a request to reconstruct an image from the compressed representation to the reconstruction network. In some embodiments, the user interface manager 1102 enables the user to view the resulting reconstructed image.

As illustrated in FIG. 11, the image compression system 1100 also includes a neural network manager 1104. Neural network manager 1104 may host a plurality of neural networks or other machine learning models, such as compression network 1110, reconstruction network 1112, and discriminator network 1114. The neural network manager 1104 may include an execution environment, libraries, and/or any other data needed to execute the machine learning models. In some embodiments, the neural network manager 1104 may be associated with dedicated software and/or hardware resources to execute the machine learning models. As discussed, compression network 1110 may include an encoder and an importance map network. Although depicted in FIG. 11 as being hosted by a single neural network manager 1104, in various embodiments the neural networks may be hosted in multiple neural network managers and/or as part of different components. For example, each network can be hosted by their own neural network manager, or other host environment, in which the respective neural networks execute, or the GANs may be spread across multiple neural network managers depending on, e.g., the resource requirements of each network, etc.

As illustrated in FIG. 11 the image compression system 1100 also includes training system 1106. The training system 1106 can teach, guide, tune, and/or train one or more neural networks. In particular, the training system 1106 can train a neural network based on a plurality of training data. For example, the compression network 1110, reconstruction network 1112 and discriminator network 1114 may be trained to compress and reconstruct images according to user-provided importance values and a target bitrate, as discussed above. This may be performed using loss functions 1116, as discussed above, and backpropagating gradient descents. More specifically, the training system 1106 can access, identify, generate, create, and/or determine training input and utilize the training input to train and fine-tune a neural network. For instance, the training system 1106 can train the networks, end-to-end, as discussed above.

As illustrated in FIG. 11, the image compression system 1100 also includes the storage manager 1108. The storage manager 1108 maintains data for the image compression system 1100. The storage manager 1108 can maintain data of any type, size, or kind as necessary to perform the functions of the image compression system 1100. The storage manager 1108, as shown in FIG. 11, includes the input image 1118. The input image 1118 can include a digital image to be compressed, as discussed in additional detail above. In some embodiments, the input image 1118 can also include a segmentation mask of the image, dividing the image into one or more regions. Alternatively, in some embodiments, the segmentation mask may be generated by a segmentation network hosted by neural network manager 1104 or by another system or service.

As further illustrated in FIG. 11, the storage manager 1108 also includes compressed representation 1120. Compressed representation 1120 is generated by compression network 1110, as discussed above. The storage manager 1108 may also include reconstructed image 1122. The reconstructed image 1122 can be generated by the reconstruction network 1112, as discussed above. The storage manager 1108 may further include training data 1124. The training data 1124 may images and corresponding segmentation masks. As discussed, during training, target bitrates and importance values can be sampled during training. In particular, in one or more embodiments, the training data 1124 includes digital images and segmentation masks utilized by the training system 1106 to train one or more neural networks to compress image data at variable bitrates.

Each of the components 1102-1108 of the image compression system 1100 and their corresponding elements (as shown in FIG. 11) may be in communication with one another using any suitable communication technologies. It will be recognized that although components 1102-1108 and their corresponding elements are shown to be separate in FIG. 11, any of components 1102-1108 and their corresponding elements may be combined into fewer components, such as into a single facility or module, divided into more components, or configured into different components as may serve a particular embodiment.

The components 1102-1108 and their corresponding elements can comprise software, hardware, or both. For example, the components 1102-1108 and their corresponding elements can comprise one or more instructions stored on a computer-readable storage medium and executable by processors of one or more computing devices. When executed by the one or more processors, the computer-executable instructions of the image compression system 1100 can cause a client device and/or a server device to perform the methods described herein. Alternatively, the components 1102-1108 and their corresponding elements can comprise hardware, such as a special purpose processing device to perform a certain function or group of functions. Additionally, the components 1102-1108 and their corresponding elements can comprise a combination of computer-executable instructions and hardware.

Furthermore, the components 1102-1108 of the image compression system 1100 may, for example, be implemented as one or more stand-alone applications, as one or more modules of an application, as one or more plug-ins, as one or more library functions or functions that may be called by other applications, and/or as a cloud-computing model. Thus, the components 1102-1108 of the image compression system 1100 may be implemented as a stand-alone application, such as a desktop or mobile application. Furthermore, the components 1102-1108 of the image compression system 1100 may be implemented as one or more web-based applications hosted on a remote server. Alternatively, or additionally, the components of the image compression system 1100 may be implemented in a suit of mobile device applications or "apps."

Figure 12:
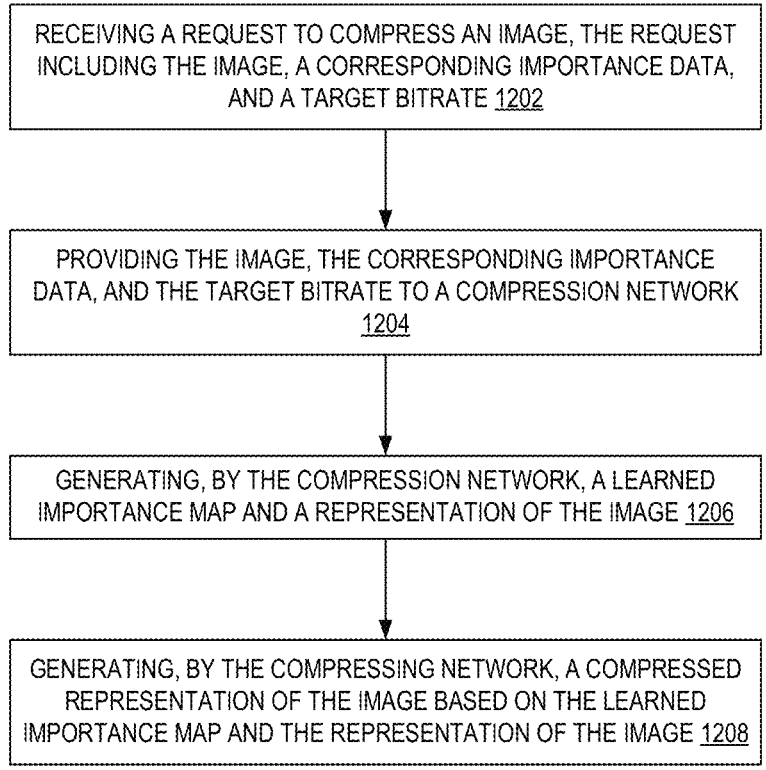
FIG. 12 illustrates a flowchart of a series of acts in a method of image compression in accordance with one or more embodiments.

FIGS. 1-11, the corresponding text, and the examples, provide a number of different systems and devices that enable user-guided variable bitrate compression. In addition to the foregoing, embodiments can also be described in terms of flowcharts comprising acts and steps in a method for accomplishing a particular result. For example, FIG. 12 illustrates a flowchart of an exemplary method in accordance with one or more embodiments. The method described in relation to FIG. 12 may be performed with fewer or more steps/acts or the steps/acts may be performed in differing orders. Additionally, the steps/acts described herein may be repeated or performed in parallel with one another or in parallel with different instances of the same or similar steps/acts.

FIG. 12 illustrates a flowchart 1200 of a series of acts in a method of image compression in accordance with one or more embodiments. In one or more embodiments, the method 1200 is performed in a digital medium environment that includes the image compression system 1100. The method 1200 is intended to be illustrative of one or more methods in accordance with the present disclosure and is not intended to limit potential embodiments. Alternative embodiments can include additional, fewer, or different steps than those articulated in FIG. 12.

As illustrated in FIG. 12, the method 1200 includes an act 1202 of receiving a request to compress an image, the request including the image, a corresponding importance data, and a target bitrate. As discussed, in some embodiments the importance data includes a segmentation mask corresponding to the image and importance values for each region of the segmentation mask. The segmentation mask can be provided by the user or may be generated by a segmentation network provided by the image compression system.

As illustrated in FIG. 12, the method 1200 also includes an act 1204 of providing the image, the corresponding importance data, and the target bitrate to a compression network. In some embodiments, providing the image, the corresponding importance data, and the target bitrate to a compression network, further comprises concatenating the image and the segmentation mask and providing the concatenated image and segmentation mask to an encoder of the compression network.

As illustrated in FIG. 12, the method 1200 also includes an act 1206 of generating, by the compression network, a learned importance map and a representation of the image. In some embodiments, generating, by the compression network, a learned importance map and a representation of the image, further comprises providing an intermediate representation generated by the encoder to an importance map network of the compression network, generating, by the encoder, the representation of the image, and generating, by the importance map network, the learned importance map from the intermediate representation.

As illustrated in FIG. 12, the method 1200 also includes an act 1208 of generating, by the compressing network, a compressed representation of the image based on the learned importance map and the representation of the image. In some embodiments, generating, by the compressing network, a compressed representation of the image based on the learned importance map and the representation of the image, further comprises determining an element-wise product of the learned representation map and the representation of the image. In some embodiments, the learned importance map defines an importance value for each pixel of the image and wherein within a region of the segmentation mask high detail pixels receive a higher importance value than low detail pixels.

In some embodiments, receiving a request to compress an image, the request including the image, a corresponding importance data, and a target bitrate, further comprises receiving, via a user interface, an importance value for each region of a segmentation mask corresponding to the image.

In some embodiments, the method further comprises receiving a request for the image, the request including at least a reference to the compressed representation of the image, providing the compressed representation of the image to a reconstruction network, and returning a reconstructed image generated by the reconstruction network. As discussed, the compressed representation can be stored remotely and retrieved to be reconstructed. Given the low bitrates that the compression pipeline enables, the storage space and bandwidth required to maintain the compressed representation and transmit them is greatly reduced.

As discussed, GAN-style training may be performed on the compression network and reconstruction network. For example, a discriminator network and one or more loss functions are used to train the compression network to generate compressed representations at variable bitrates based on user-provided importance values and a reconstruction network to generate photorealistic images from the compressed representations. In some embodiments, the one or more loss function includes an equivalence distortion loss function that trains the importance map network to learn to allocate bits optimally in the learned importance map while staying within the target bitrate.

Figure 13:
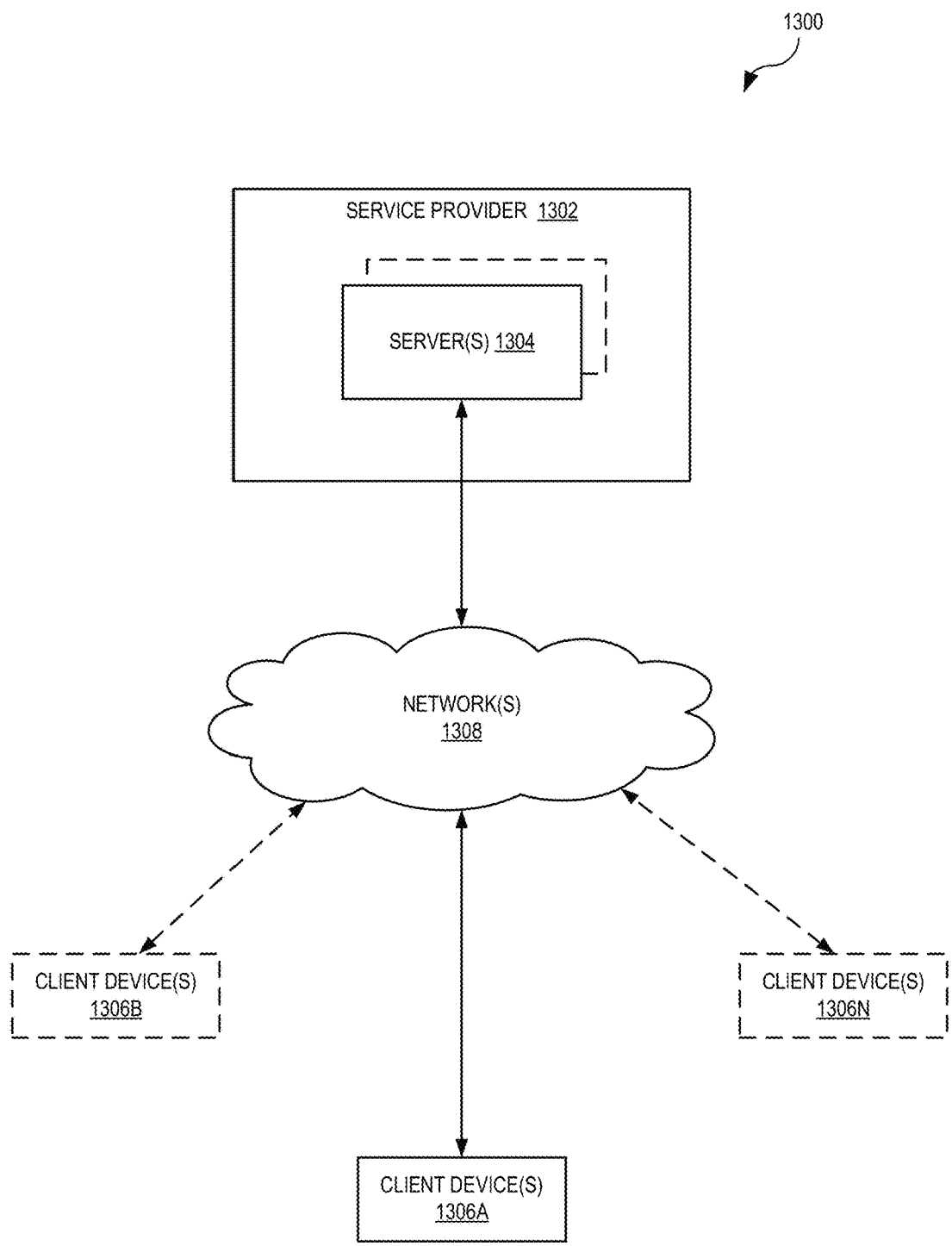
FIG. 13 illustrates a schematic diagram of an exemplary environment in which the image processing system can operate in accordance with one or more embodiments.

FIG. 13 illustrates a schematic diagram of an exemplary environment 1300 in which the image compression system 1100 can operate in accordance with one or more embodiments. In one or more embodiments, the environment 1300 includes a service provider 1302 which may include one or more servers 1304 connected to a plurality of client devices 1306A-1306N via one or more networks 1308. The client devices 1306A-1306N, the one or more networks 1308, the service provider 1302, and the one or more servers 1304 may communicate with each other or other components using any communication platforms and technologies suitable for transporting data and/or communication signals, including any known communication technologies, devices, media, and protocols supportive of remote data communications, examples of which will be described in more detail below with respect to FIG. 14.

Although FIG. 13 illustrates a particular arrangement of the client devices 1306A-1306N, the one or more networks 1308, the service provider 1302, and the one or more servers 1304, various additional arrangements are possible. For example, the client devices 1306A-1306N may directly communicate with the one or more servers 1304, bypassing the network 1308. Or alternatively, the client devices 1306A-1306N may directly communicate with each other. The service provider 1302 may be a public cloud service provider which owns and operates their own infrastructure in one or more data centers and provides this infrastructure to customers and end users on demand to host applications on the one or more servers 1304. The servers may include one or more hardware servers (e.g., hosts), each with its own computing resources (e.g., processors, memory, disk space, networking bandwidth, etc.) which may be securely divided between multiple customers, each of which may host their own applications on the one or more servers 1304. In some embodiments, the service provider may be a private cloud provider which maintains cloud infrastructure for a single organization. The one or more servers 1304 may similarly include one or more hardware servers, each with its own computing resources, which are divided among applications hosted by the one or more servers for use by members of the organization or their customers.

Similarly, although the environment 1300 of FIG. 13 is depicted as having various components, the environment 1300 may have additional or alternative components. For example, the environment 1300 can be implemented on a single computing device with the image compression system 1100. In particular, the image compression system 1100 may be implemented in whole or in part on the client device 1302A.

As illustrated in FIG. 13, the environment 1300 may include client devices 1306A-1306N. The client devices 1306A-1306N may comprise any computing device. For example, client devices 1306A-1306N may comprise one or more personal computers, laptop computers, mobile devices, mobile phones, tablets, special purpose computers, TVs, or other computing devices, including computing devices described below with regard to FIG. 14. Although three client devices are shown in FIG. 13, it will be appreciated that client devices 1306A-1306N may comprise any number of client devices (greater or smaller than shown).

Moreover, as illustrated in FIG. 13, the client devices 1306A-1306N and the one or more servers 1304 may communicate via one or more networks 1308. The one or more networks 1308 may represent a single network or a collection of networks (such as the Internet, a corporate intranet, a virtual private network (VPN), a local area network (LAN), a wireless local network (WLAN), a cellular network, a wide area network (WAN), a metropolitan area network (MAN), or a combination of two or more such networks. Thus, the one or more networks 1308 may be any suitable network over which the client devices 1306A-1306N may access service provider 1302 and server 1304, or vice versa. The one or more networks 1308 will be discussed in more detail below with regard to FIG. 14.

In addition, the environment 1300 may also include one or more servers 1304. The one or more servers 1304 may generate, store, receive, and transmit any type of data, including input images 1118, compressed representations 1120, reconstructed images 1122, training data 1124, or other information. For example, a server 1304 may receive data from a client device, such as the client device 1306A, and send the data to another client device, such as the client device 1302B and/or 1302N. The server 1304 can also transmit electronic messages between one or more users of the environment 1300. In one example embodiment, the server 1304 is a data server. The server 1304 can also comprise a communication server or a web-hosting server. Additional details regarding the server 1304 will be discussed below with respect to FIG. 14.

As mentioned, in one or more embodiments, the one or more servers 1304 can include or implement at least a portion of the image compression system 1100. In particular, the image compression system 1100 can comprise an application running on the one or more servers 1304 or a portion of the image compression system 1100 can be downloaded from the one or more servers 1304. For example, the image compression system 1100 can include a web hosting application that allows the client devices 1306A-1306N to interact with content hosted at the one or more servers 1304. To illustrate, in one or more embodiments of the environment 1300, one or more client devices 1306A-1306N can access a webpage supported by the one or more servers 1304. In particular, the client device 1306A can run a web application (e.g., a web browser) to allow a user to access, view, and/or interact with a webpage or website hosted at the one or more servers 1304.

Upon the client device 1306A accessing a webpage or other web application hosted at the one or more servers 1304, in one or more embodiments, the one or more servers 1304 can provide access to one or more digital images (e.g., the input image data 1118, such as camera roll or an individual's personal photos and corresponding compressed representations 1120) stored at the one or more servers 1304. Moreover, the client device 1306A can receive a request (i.e., via user input) to retrieve an image and provide the request to the one or more servers 1304. Upon receiving the request, the one or more servers 1304 can return a corresponding compressed representation of the requested image. The client device can then automatically perform the methods and processes described above to reconstruct the requested image using the compressed representation.

As just described, the image compression system 1100 may be implemented in whole, or in part, by the individual elements 1302-1308 of the environment 1300. It will be appreciated that although certain components of the image compression system 1100 are described in the previous examples with regard to particular elements of the environment 1300, various alternative implementations are possible. For instance, in one or more embodiments, the image compression system 1100 is implemented on any of the client devices 1306A-N. Similarly, in one or more embodiments, the image compression system 1100 may be implemented on the one or more servers 1304. Moreover, different components and functions of the image compression system 1100 may be implemented separately among client devices 1306A-1306N, the one or more servers 1304, and the network 1308.

Embodiments of the present disclosure may comprise or utilize a special purpose or general-purpose computer including computer hardware, such as, for example, one or more processors and system memory, as discussed in greater detail below. Embodiments within the scope of the present disclosure also include physical and other computer-readable media for carrying or storing computer-executable instructions and/or data structures. In particular, one or more of the processes described herein may be implemented at least in part as instructions embodied in a non-transitory computer-readable medium and executable by one or more computing devices (e.g., any of the media content access devices described herein). In general, a processor (e.g., a microprocessor) receives instructions, from a non-transitory computer-readable medium, (e.g., a memory, etc.), and executes those instructions, thereby performing one or more processes, including one or more of the processes described herein.

Computer-readable media can be any available media that can be accessed by a general purpose or special purpose computer system. Computer-readable media that store computer-executable instructions are non-transitory computer-readable storage media (devices). Computer-readable media that carry computer-executable instructions are transmission media. Thus, by way of example, and not limitation, embodiments of the disclosure can comprise at least two distinctly different kinds of computer-readable media: non-transitory computer-readable storage media (devices) and transmission media.

Non-transitory computer-readable storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to non-transitory computer-readable storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. Thus, it should be understood that non-transitory computer-readable storage media (devices) can be included in computer system components that also (or even primarily) utilize transmission media.

Computer-executable instructions comprise, for example, instructions and data which, when executed at a processor, cause a general-purpose computer, special purpose computer, or special purpose processing device to perform a certain function or group of functions. In some embodiments, computer-executable instructions are executed on a general-purpose computer to turn the general-purpose computer into a special purpose computer implementing elements of the disclosure. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the disclosure may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like. The disclosure may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the present disclosure can also be implemented in cloud computing environments. In this description, "cloud computing" is defined as a model for enabling on-demand network access to a shared pool of configurable computing resources. For example, cloud computing can be employed in the marketplace to offer ubiquitous and convenient on-demand access to the shared pool of configurable computing resources. The shared pool of configurable computing resources can be rapidly provisioned via virtualization and released with low management effort or service provider interaction, and then scaled accordingly.

A cloud-computing model can be composed of various characteristics such as, for example, on-demand self-service, broad network access, resource pooling, rapid elasticity, measured service, and so forth. A cloud-computing model can also expose various service models, such as, for example, Software as a Service ("SaaS"), Platform as a Service ("PaaS"), and Infrastructure as a Service ("IaaS"). A cloud-computing model can also be deployed using different deployment models such as private cloud, community cloud, public cloud, hybrid cloud, and so forth. In this description and in the claims, a "cloud-computing environment" is an environment in which cloud computing is employed.

Figure 14:
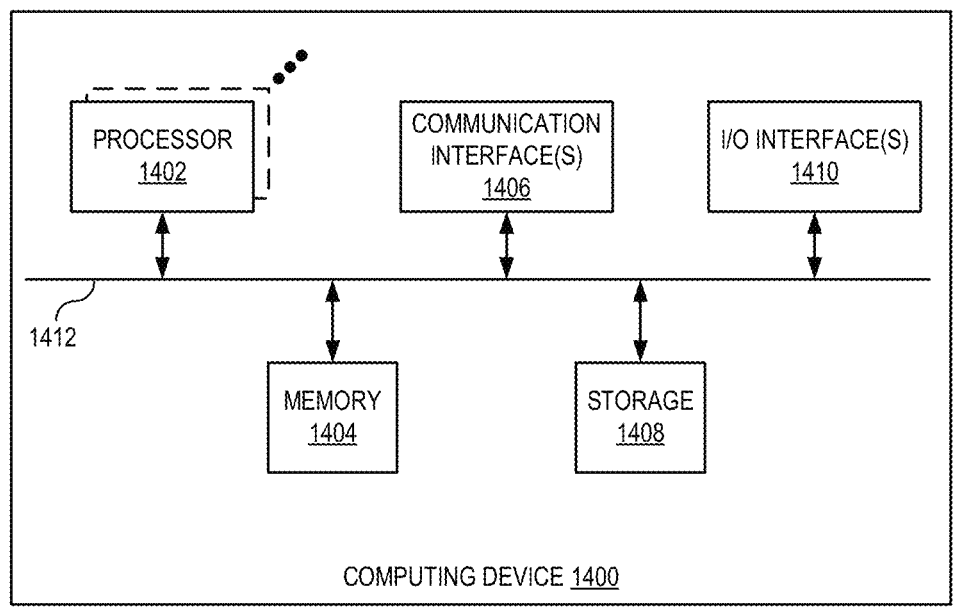
FIG. 14 illustrates a block diagram of an exemplary computing device in accordance with one or more embodiments.

FIG. 14 illustrates, in block diagram form, an exemplary computing device 1400 that may be configured to perform one or more of the processes described above. One will appreciate that one or more computing devices such as the computing device 1400 may implement the image processing system. As shown by FIG. 14, the computing device can comprise a processor 1402, memory 1404, one or more communication interfaces 1406, a storage device 1408, and one or more I/O devices/interfaces 1410. In certain embodiments, the computing device 1400 can include fewer or more components than those shown in FIG. 14. Components of computing device 1400 shown in FIG. 14 will now be described in additional detail.

In particular embodiments, processor(s) 1402 includes hardware for executing instructions, such as those making up a computer program. As an example, and not by way of limitation, to execute instructions, processor(s) 1402 may retrieve (or fetch) the instructions from an internal register, an internal cache, memory 1404, or a storage device 1408 and decode and execute them. In various embodiments, the processor(s) 1402 may include one or more central processing units (CPUs), graphics processing units (GPUs), field programmable gate arrays (FPGAs), systems on chip (SoC), or other processor(s) or combinations of processors.

The computing device 1400 includes memory 1404, which is coupled to the processor(s) 1402. The memory 1404 may be used for storing data, metadata, and programs for execution by the processor(s). The memory 1404 may include one or more of volatile and non-volatile memories, such as Random Access Memory ("RAM"), Read Only Memory ("ROM"), a solid state disk ("SSD"), Flash, Phase Change Memory ("PCM"), or other types of data storage. The memory 1404 may be internal or distributed memory.

The computing device 1400 can further include one or more communication interfaces 1406. A communication interface 1406 can include hardware, software, or both. The communication interface 1406 can provide one or more interfaces for communication (such as, for example, packet-based communication) between the computing device and one or more other computing devices 1400 or one or more networks. As an example and not by way of limitation, communication interface 1406 may include a network interface controller (NIC) or network adapter for communicating with an Ethernet or other wire-based network or a wireless NIC (WNIC) or wireless adapter for communicating with a wireless network, such as a WI-FI. The computing device 1400 can further include a bus 1412. The bus 1412 can comprise hardware, software, or both that couples components of computing device 1400 to each other.

The computing device 1400 includes a storage device 1408 includes storage for storing data or instructions. As an example, and not by way of limitation, storage device 1408 can comprise a non-transitory storage medium described above. The storage device 1408 may include a hard disk drive (HDD), flash memory, a Universal Serial Bus (USB) drive or a combination these or other storage devices. The computing device 1400 also includes one or more input or output ("I/O") devices/interfaces 1410, which are provided to allow a user to provide input to (such as user strokes), receive output from, and otherwise transfer data to and from the computing device 1400. These I/O devices/interfaces 1410 may include a mouse, keypad or a keyboard, a touch screen, camera, optical scanner, network interface, modem, other known I/O devices or a combination of such I/O devices/interfaces 1410. The touch screen may be activated with a stylus or a finger.

The I/O devices/interfaces 1410 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O devices/interfaces 1410 is configured to provide graphical data to a display for presentation to a user. The graphical data may be representative of one or more graphical user interfaces and/or any other graphical content as may serve a particular implementation.

In the foregoing specification, embodiments have been described with reference to specific exemplary embodiments thereof. Various embodiments are described with reference to details discussed herein, and the accompanying drawings illustrate the various embodiments. The description above and drawings are illustrative of one or more embodiments and are not to be construed as limiting. Numerous specific details are described to provide a thorough understanding of various embodiments.

Embodiments may include other specific forms without departing from its spirit or essential characteristics. The described embodiments are to be considered in all respects only as illustrative and not restrictive. For example, the methods described herein may be performed with less or more steps/acts or the steps/acts may be performed in differing orders. Additionally, the steps/acts described herein may be repeated or performed in parallel with one another or in parallel with different instances of the same or similar steps/acts. The scope of the invention is, therefore, indicated by the appended claims rather than by the foregoing description. All changes that come within the meaning and range of equivalency of the claims are to be embraced within their scope.

In the various embodiments described above, unless specifically noted otherwise, disjunctive language such as the phrase "at least one of A, B, or C," is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

We claim:

1. A computer-implemented method comprising:
   receiving, via a user interface, a request to compress an image, the request including the image;
   causing a segmentation mask corresponding to the image to be displayed in the user interface;
   receiving, via the user interface, importance data for each region of the segmentation mask corresponding to the image and a target bitrate;
   providing the image, the corresponding importance data, and the target bitrate to a compression network;
   generating, by the compression network, a learned importance map and a representation of the image;
   generating, by the compression network, a compressed representation of the image based on the learned importance map and the representation of the image;
   dynamically updating the importance data for one or more regions of the segmentation mask using the user interface; and generating, by the compression network, a second compressed representation of the image based on a second learned importance map and a second representation of the image.

2. The computer-implemented method of claim 1, wherein the importance data includes a segmentation mask corresponding to the image and importance values for each region of the segmentation mask.

3. The computer-implemented method of claim 2, wherein providing the image, the corresponding importance data, and the target bitrate to a compression network, further comprises:
   concatenating the image and the segmentation mask; and
   providing the concatenated image and segmentation mask to an encoder of the compression network.

4. The computer-implemented method of claim 3, wherein generating, by the compression network, a learned importance map and a representation of the image, further comprises:
   providing an intermediate representation generated by the encoder to an importance map network of the compression network;
   generating, by the encoder, the representation of the image; and
   generating, by the importance map network, the learned importance map from the intermediate representation.

5. The computer-implemented method of claim 4, wherein the learned importance map defines an importance value for each pixel of the image and wherein within a region of the segmentation mask, high detail pixels receive a higher importance value than low detail pixels.

6. The computer-implemented method of claim 1, wherein generating, by the compression network, a compressed representation of the image based on the learned importance map and the representation of the image, further comprises:
   determining an element-wise product of the learned importance map and the representation of the image.

7. The computer-implemented method of claim 1, further comprising:
   receiving a request for the image, the request including at least a reference to the compressed representation of the image;
   providing the compressed representation of the image to a reconstruction network; and
   returning a reconstructed image generated by the reconstruction network.

8. The computer-implemented method of claim 1, wherein a discriminator network and one or more loss functions are used to train the compression network to generate compressed representations at variable bitrates based on user-provided importance values and a reconstruction network to generate photorealistic images from the compressed representations.

9. The computer-implemented method of claim 8, wherein the one or more loss functions includes an equivalence distortion loss function that trains the compression network to learn to allocate bits optimally in the learned importance map while staying within the target bitrate.

10. A non-transitory computer-readable storage medium including instructions stored thereon which, when executed by at least one processor, cause the at least one processor to:
   receive, via a user interface, a request to compress an image, the request including the image;
   cause a segmentation mask corresponding to the image to be displayed in the user interface;
   receive, via the user interface, importance data for each region of the segmentation mask corresponding to the image and a target bitrate;
   provide the image, the corresponding importance data, and the target bitrate to a compression network;
   generate, by the compression network, a learned importance map and a representation of the image;
   generate, by the compression network, a compressed representation of the image based on the learned importance map and the representation of the image;
   dynamically updating the importance data for one or more regions of the segmentation mask using the user interface; and
   generating, by the compression network, a second compressed representation of the image based on a second learned importance map and a second representation of the image.

11. The non-transitory computer-readable storage medium of claim 10, wherein the importance data includes a segmentation mask corresponding to the image and importance values for each region of the segmentation mask.

12. The non-transitory computer-readable storage medium of claim 11, wherein to provide the image, the corresponding importance data, and the target bitrate to a compression network, the instructions, when executed, further cause the at least one processor to:
   concatenate the image and the segmentation mask; and
   provide the concatenated image and segmentation mask to an encoder of the compression network.

13. The non-transitory computer-readable storage medium of claim 12, wherein to generate, by the compression network, a learned importance map and a representation of the image, the instructions, when executed, further cause the at least one processor to:
   provide an intermediate representation generated by the encoder to an importance map network of the compression network;
   generate, by the encoder, the representation of the image; and
   generate, by the importance map network, the learned importance map from the intermediate representation.

14. The non-transitory computer-readable storage medium of claim 13, wherein the learned importance map defines an importance value for each pixel of the image and wherein within a region of the segmentation mask, high detail pixels receive a higher importance value than low detail pixels.

15. The non-transitory computer-readable storage medium of claim 10, wherein to generate, by the compression network, a compressed representation of the image based on the learned importance map and the representation of the image, the instructions, when executed, further cause the at least one processor to:
   determine an element-wise product of the learned importance map and the representation of the image.

16. The non-transitory computer-readable storage medium of claim 10, wherein a discriminator network and one or more loss functions are used to train the compression network to generate compressed representations at variable bitrates based on user-provided importance values and a reconstruction network to generate photorealistic images from the compressed representations.

17. The non-transitory computer-readable storage medium of claim 16, wherein the one or more loss functions includes an equivalence distortion loss function that trains the compression network to learn to allocate bits optimally in the learned importance map while staying within the target bitrate.

18. A system comprising:
- at least one processor; and
- a memory storing instructions which, when executed by the at least one processor, cause the system to:
  - receive, via a user interface, a request to compress an image, the request including the image;
  - cause a segmentation mask corresponding to the image to be displayed in the user interface;
  - receive, via the user interface, importance data for each region of the segmentation mask corresponding to the image and a target bitrate;
  - provide the image, the corresponding importance data, and the target bitrate to a compression network;
  - generate, by the compression network, a learned importance map and a representation of the image;
  - generate, by the compression network, a compressed representation of the image based on the learned importance map and the representation of the image;
  - dynamically updating the importance data for one or more regions of the segmentation mask using the user interface; and
  - generating, by the compression network, a second compressed representation of the image based on a second learned importance map and a second representation of the image.

19. The system of claim 18, wherein the importance data includes a segmentation mask corresponding to the image and importance values for each region of the segmentation mask.

\* \* \* \* \*